United States Patent [19]

Murakami et al.

[11] Patent Number: 5,305,254
[45] Date of Patent: Apr. 19, 1994

[54] MAGNETO-OPTIC MEMORY DEVICE

[75] Inventors: Yoshiteru Murakami, Nishinomiya; Junichiro Nakayama, Nara; Ichiro Hiramatsu, Nara; Akira Takahashi, Nara; Kenji Ohta, Nara; Kazuo Van, Nara; Hiroyuki Katayama, Nara, all of Japan

[73] Assignee: Sharp Kabushiki Kaisha, Osaka, Japan

[21] Appl. No.: 993,517

[22] Filed: Dec. 17, 1992

Related U.S. Application Data

[63] Continuation of Ser. No. 875,606, Apr. 28, 1992, abandoned.

[30] Foreign Application Priority Data

Dec. 15, 1987 [JP] Japan .................. 62-317757
Dec. 15, 1987 [JP] Japan .................. 62-317759

[51] Int. Cl.$^5$ .............................................. G11C 13/04
[52] U.S. Cl. ..................................... 365/122; 365/119; 369/13
[58] Field of Search ........................ 369/13, 100, 110; 360/135; 365/122, 119

[56] References Cited

U.S. PATENT DOCUMENTS

| 4,635,076 | 1/1987 | Willson et al. .................. 365/122 |
| 4,658,388 | 4/1987 | Ishiwatari et al. .............. 369/13 X |
| 4,735,648 | 4/1988 | Nomura et al. ................. 365/122 |
| 4,803,129 | 2/1989 | Noriai et al. .................... 365/122 |
| 4,855,992 | 8/1989 | Ikegawa et al. ................. 369/100 |
| 4,861,656 | 8/1989 | Uchiyama et al. .............. 365/122 |

FOREIGN PATENT DOCUMENTS 57-12428  1/1982  Japan .

OTHER PUBLICATIONS

Applied Optics, vol. 23, No. 22, pp. 3972–3978, Nov. 15, 1984 "Digital Magnetooptic disk drive" by Deguchi et al.

Primary Examiner—Terrell W. Fears

[57] ABSTRACT

A magneto-optic memory device, such as a magneto-optic disk or magneto-optic card having a pair of opposed substrates at least one of which is transparent. Between the substrates is a magneto-optic memory layer made of a stack of dielectric film, a rear earth-transition metal alloy thin film, a dielectric film and a light reflecting film built on the surface of the transparent substrate opposed to the other substrate. An adhesive layer covers the memory layer and bonds the transparent substrate to the other substrate. Lastly, a metal nitride film interposed between the light reflecting film of the memory layer and the adhesive layer.

19 Claims, 2 Drawing Sheets

(120°C, 100% RH, 2 at.)

MAGNETO-OPTIC MEMORY DEVICE

This application is a continuation of application Ser. No. 07/875,606 filed on Apr. 28, 1992, now abandoned.

BACKGROUND OF THE INVENTION

1. Field of the Invention

The present invention relates to magneto-optic memory devices, and more particularly to magneto-optic memory devices, such as magneto-optic discs and magneto-optic cards, which are adapted to record data thereon and reproduce or erase the data therefrom when exposed, for example, to a laser beam.

2. Description of the Prior Art

Active research has been conducted in recent years for the development of magneto-optic memory device such as optical memory devices adapted for recording, reproducing and erasing data. Especially attention has been directed to devices wherein a rare earth-transition metal alloy thin film is used as the memory medium because the recording bits are free of the influence of the grain boundary and further because the film serving as the memory medium can be formed over a large area relatively easily. However, the magneto-optic memory devices incorporating the rare earth-transition metal alloy thin film as the memory medium generally fail to exhibit satisfactory magneto-optic effects (Kerr effect and Faraday effect) and therefore remain to be improved in the S/N ratio of reproduction signals. To overcome this problem, the so-called reflective film structure is employed for magneto-optic memory devices as already disclosed, for example, in Unexamined Japanese Patent Publication SHO 57-12428 and Applied Optics, Vol. 23, No. 22, p. 3472-3978.

FIG. 3 is a partial view of a vertical section showing a conventional magneto-optic memory device having a reflective film structure. With reference to the drawing, indicated at a is a transparent substrate of glass, polycarbonate resin, epoxy resin or the like, at b a transparent dielectric film having a higher refractive index than the substrate a at c a rare earth-transition metal alloy thin film, at d a transparent dielectric film, and a e a light reflecting film of metal.

With a memory device having the above construction, the rare earth-transition metal alloy film c is so thin that the light incident on the film c partly passes through the film. Consequently, reproduction light exhibits the Kerr effect due to the reflection at the surface of the film c and, in combination therewith, the Faraday effect which is produced by the portion of the light passing through the film c, reflected at the reflecting film e and passing through the film c again. This results in a Kerr rotation angle which is apparently several times as great as the angle afforded by the Kerr effect only. For example, the device shown in FIG. 3 exhibits an increased apparent Kerr rotation angle of 1.6 degrees (although a single GdTbFe film is about 0.3 degree in this angle) when the device comprises a glass substrate as the transparent substrate a, AlN film as the transparent dielectric film b, GdTbFe film as the rare earth-transition metal alloy film c, AlN film as the transparent dielectric film d and Al film as the light reflecting film e.

Nevertheless, the rare earth-transition metal alloy thin film is very susceptible to oxidation in the presence of moisture and loses the inherent magneto-optic characteristics thereof on oxidation. Especially with the device of the basic reflective film structure described above wherein the alloy film c needs to transmit light therethrough, the film is more prone to the influence of oxidation because the film must have a considerably decreased thickness and also because the film is left exposed at its end. In other words, the device has the problem of being poor in long-term reliability.

Accordingly, the device of reflective film structure described above is used usually with another substrate laminated to the reflecting film with an adhesive layer. The adhesive layer is used for covering the entire magneto-optic memory layer comprising the dielectric film b, alloy film c, dielectric film d and light reflecting film e and also for adhering the other substrate.

When the device is in this form, it is expected that the magneto-optic memory layer including the alloy film will be held out of direct contact with the atmosphere, with the alloy film protected against oxidation, so as to assure the device of reliability.

Nevertheless, the structure thus sealing off the device from the atmosphere still encounters difficulty in assuring long-term reliability.

The object of the present invention is to overcome the foregoing problem and to provide a magneto-optic memory device of reflective film structure which exhibits outstanding magneto-optic characteristics over a prolonged period of time.

SUMMARY OF THE INVENTION

We have conducted intensive research thinking that the degradation of the magneto-optic characteristics of the device which is sealed-off from the atmosphere is attributable to the low adhesion of the adhesive layer to the light reflecting metal film, such that the entire adhesive layer becomes impaired in adhesion, permitting atmospheric moisture to penetrate through the adhesive joint and consequently entailing progressive degradation of the rare earth-transition metal alloy thin film.

Our research has revealed that the reliability of the device having the structure described above can be remarkably improved by forming a metal nitride film over the light reflecting film of the magneto-optic memory layer.

Thus, the present invention provides a magneto-optic memory device having;

- a pair of opposed substrates at least one of which is transparent;
- a magneto-optic memory layer composed of a dielectric film, a rare earth-transition metal alloy thin film, a dielectric film and a light reflecting film in this order on the surface of the transparent substrate opposed to the other substrate;
- an adhesive layer covering the memory layer and bonding the transparent substrate to the other substrate; and
- a metal nitride film interposed between the light reflecting film of the memory layer and the adhesive layer.

The magneto-optic memory device of the present invention is remarkably improved preventing moisture and consequently greatly improved in reliability without impairing the inherent magneto-optic characteristics thereof.

With the above-described memory device, the other substrate opposed to the transparent substrate may be one formed with the same metal nitride film as above over the surface thereof opposed to the transparent substrate. The use of this substrate further improves the memory device in preventing moisture and reliability. The invention therefore also provides a magneto-optic memory device wherein such a substrate is used as the other substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawing which is given by way of illustration only, and thus is not limitative of the present invention, and wherein:

FIG. 5 is a fragmentary view of a partial vertical section of one preferred embodiment of the present invention is a rectangular form.

DESCRIPTION OF THE PREFERRED EMBODIMENTS

Figure 1:
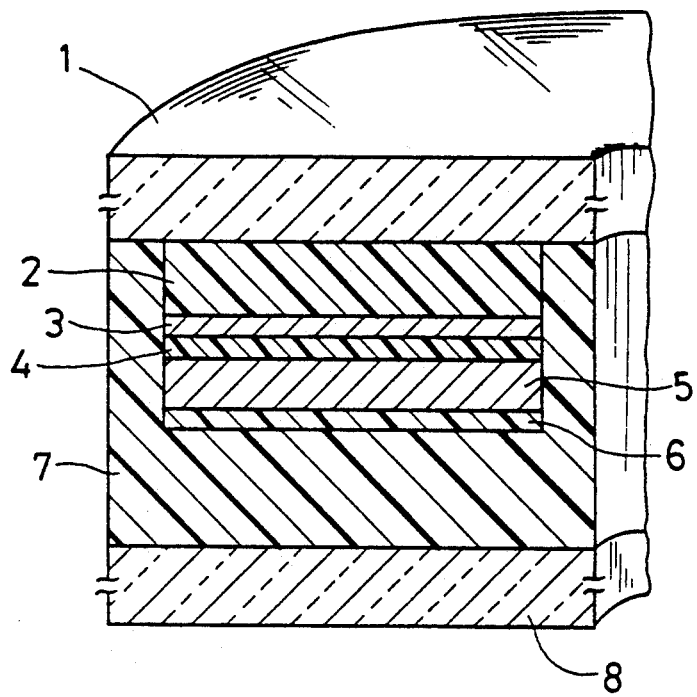
FIGS. 1 and 2 are fragmentary views of partial vertical sections, each showing a magneto-optic memory device, more specifically a magneto-optic disc, embodying a preferred embodiment of the invention.

According to the invention, a pair of substrates are used, at least one of which is a transparent substrate. The transparent substrate can be prepared from glass, polycarbonate resin, acrylic resin, epoxy resin or like plastics. The other substrate, which may be a similar transparent substrate, can be a nontransparent substrate, for example, of aluminum or ceramics.

Examples of useful dielectric films for forming the magneto-optic memory layer are transparent metal nitride film, metal oxide films, metal sulfide films and the like, such as silicon nitride, aluminum nitride, silicon oxide, aluminum oxide and zinc sulfide films. The dielectric film may be doped with a hetero element such as yttrium, oxygen, carbon or the like and thereby given a higher dielectric constant. The dielectric film can be formed by a known process such as CVD, sputtering or the like. The dielectric film is formed on the transparent substrate and also on a rare earth-transition metal alloy thin film. To be suitable, the dielectric film on the transparent substrate has a thickness of 50 to 100 nm, and the one on the alloy thin film is 10 to 100 nm in thickness.

The rare earth-transition metal alloy thin film for use in the invention can be made of an alloy used in the art, such as GdTbFeCo, TbFeCo, TbCo, TbFe or like alloy. However, it is desirable to use a thin film of a rare earth-transition metal alloy of the composition:

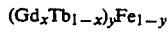

$(Gd_xTb_{1-x})_yFe_{1-y}$ wherein most preferably, x is 0.58 to 0.62, and y is 0.27 to 0.33. Use of the alloy of the composition wherein x and y are in these ranges affords magneto-optic memory devices giving data reproduction signals of a high quality, especially a high C/N ratio (carrier to noise ratio) in excess of 50 dB.

Such an alloy film can be formed on the dielectric film by CVD, sputtering or like known process. It is suitable that the film be 5 nm to 100 nm in thickness. To inhibit the possible corrosion due to moisture, the alloy film may be doped with a small quantity of corrosion-resistant metal atoms such as Cr, Ti, Al, Ta, Ni- or like atoms.

The light reflecting film to be used i-n the invention is a metal film capable of reflecting light efficiently and having high corrosion resistance. Examples of metals useful for the reflecting film are aluminum, nickel, titanium, gold, silver, tantalum, stainless steel and the like. Also usable are alloys of such metals including, for example, aluminum-nickel alloy and aluminum-titanium alloy. It is especially desirable to use aluminum or aluminum alloy. The reflecting film can be formed by a known process such as CVD or sputtering and is suitably 10 to 300 nm in thickness.

The magneto-optic memory layer composed of the films described above is formed usually on a portion of the transparent substrate.

The adhesive for covering the memory layer and bonding the other substrate can be one of various adhesives known in the art and including those curable at room temperature, by heating or with ultraviolet radiation or electron rays. Of these, it is suitable to use one having high moisture resistance. More specific examples of such adhesives are cyano-acrylate adhesives [Aron Alpha (Toagosei Chemical Industry Co., Ltd., Japan), Cyanobond (Sumitomo Chemical Co., Ltd., Japan)], ultaviolet-curable adhesives [Three Bond 3000 series (Three Bond Co., Ltd., Japan), Photobond (Meisei Churchill Co., Ltd., Japan)], aerophobic adhesives [Loctite (Japan Loctite Co., Ltd., Japan), Three Bond 1300 series], epoxy adhesives [Araldite (CIBA), Sumikadine (Sumitomo Chemical Co., Ltd.), Cemedine (Cemedine Co., Ltd., Japan)], two-component nonmixing modified acrylic adhesive [Visset (Matsumoto Chemical industry Co., Ltd., Japan)], hotmelt adhesives [H series and HR series (Nitta Gelatin Co., Ltd., Japan)], etc.

According to the present invention, a metal nitride film is formed on the magneto-optic memory layer, i.e. on the light reflecting film, before the other substrate is bonded to the memory layer with the adhesive. Examples of suitable metal nitride films are silicon nitride, aluminum nitride, silicon-aluminum nitride films and the like, among which aluminum nitride film is preferable to use. Like the other films, the metal nitride film can be formed by CVD, sputtering or like process. The thickness of this film is suitably 5 to 1000 nm, more suitably 10 to 500 nm.

After the metal nitride film has been formed, the other substrate is bonded to the film by applying and curing the adhesive, whereby a magneto-optic memory device of the invention can be obtained.

As already mentioned, the other substrate is preferably one formed with the same metal nitride film as above on the surface thereof opposed to the transparent substrate. In this case, it is desired that the nitride film be formed at least over the area opposed to and covering the memory layer.

The configuration of the memory device thus obtained, as seen from above, is not limited specifically. For example, the device can be configured in the form of a disk (magneto-optic disc) (See FIG. 1) or rectangular device (magneto-optic card) (See FIG. 5).

EXAMPLES

Magneto-optic memory devices embodying the invention will be described with reference to the drawings concerned. The numericals denoting the various layers are used consistently in FIGS. 1, 2, and 5.

EXAMPLE 1

FIG. 1 is a partial vertical section view showing the structure of a magneto-optic disc according to a preferred embodiment of a memory device of the invention. With reference to this drawing, indicated at 1 is a transparent glass substrate, 1.2 mm in thickness and 13 cm in diameter. A first transparent dielectric film 2 having a thickness of 80 nm and made of transparent aluminum nitride (AlN) is formed on the transparent substrate 1. Formed over the film 2 is a thin film (recording medium) 3 having a thickness of 20 nm and made of a rare earth-transition metal alloy of the composition

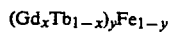

$$(Gd_xTb_{1-x})_yFe_{1-y}$$

wherein x is 0.58 to 0.62, and y is 0.27 to 0.33. A second transparent dielectric film 4 of transparent aluminum nitride (AlN), 25 nm in thickness, is formed over the alloy film 3. A light reflecting film 5 of aluminum (Al), 50 nm in thickness, is formed over the dielectric film 4, and a metal nitride (AlN) film 6, 20 nm in thickness, over the reflecting film 5.

The magneto-optic memory layer having these films is covered in its entirety with a layer 7 of acrylate adhesive cured with ultraviolet radiation. A transparent glass substrate 8 having the same size as the substrate 1 and spaced therefrom by a distance of about 30 μm is bonded to the memory layer. FIG. 5 shows the magneto-optic device in a rectangular form.

Described below are an experiment conducted for checking the magneto-optic disc for reliability and the result of the experiment.

Generally, the reliability of magneto-optic memory devices is evaluated by checking the devices for preventing moisture. A device's ability to prevent moisture is determined usually by subjecting the device to a so-called accelerated test wherein the device is allowed to stand at a high temperature and high humidity, and observing the resulting pinholes with the unaided eye or microscopically to evaluate the moistureproofness in terms of the susceptibility of the device to pinholes. The term "pinhole" as used herein refers to local oxidation of the thin film forming the device to a transparent oxide, which appears like a pinhole as distinguished from the neighboring nonoxidized portion.

In the present experiment, the devices capacity to prevent moisture was evaluated by the above method. The accelerated test was conducted under the conditions of the so-called pressure cooker test, i.e. at 120° C./100% RH at 2 atm. The test samples were the following two kinds of devices:

(1) The above embodiment of the invention, i.e., magneto-optic disc; and (2) A conventional magneto-optic disc having the same construction as the disc (1) except that the metal nitride film 6 was absent.

The samples were checked for pinholes at intervals of 2 hours after the start of testing.

Consequently, pinholes were observed in the conventional disc (2) four hours after the start of testing, whereas no pinholes were found in the disc (1) of the invention for 150 hours after the start of testing. Thus, the device of the invention was at least 30 times as high as the conventional one in moistureproofness. This appears to indicate that the adhesive exhibits higher adhesion to the metal nitride film 6 than to the light reflecting film 5, inhibiting penetration of moisture or water into the memory layer.

Figure 4:
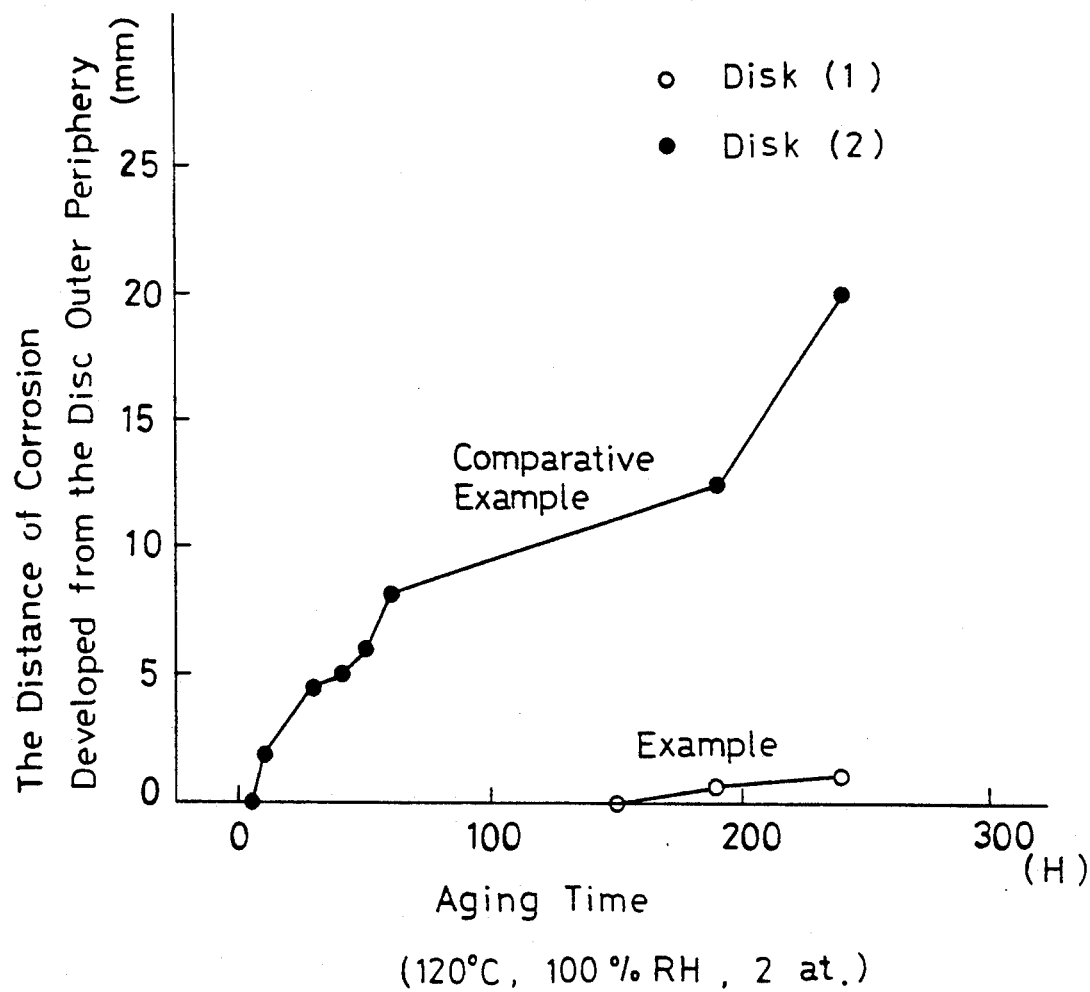
FIG. 4 is a graph showing the moisture resistance of the memory device of the invention in comparison to that of a comparative device.

In the test, the devices were checked not only for the occcurrence of pinholes but, also for the distance of corrosion developed from the disc outer periphery with the lapse of time. FIG. 4 shows the result.

EXAMPLE 2

Figure 2:
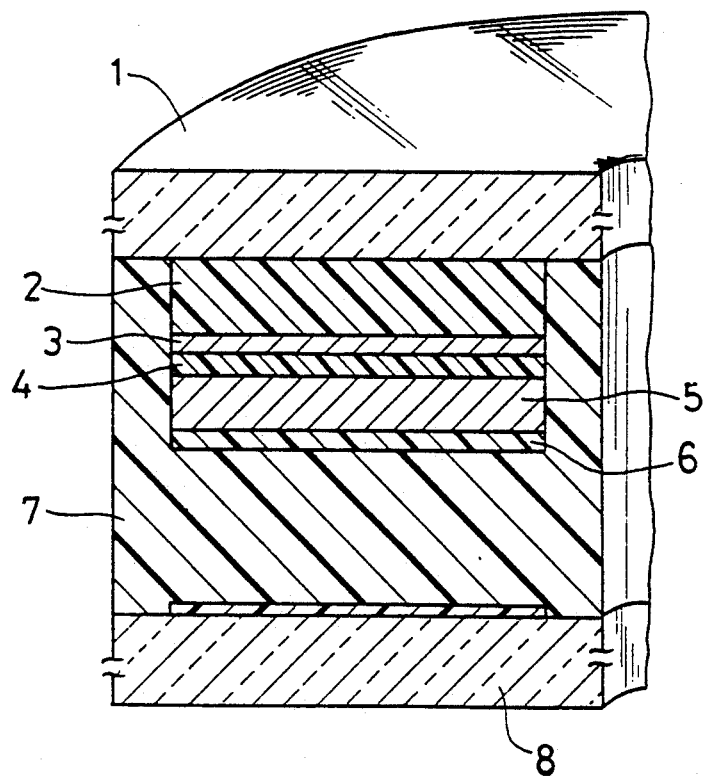
Figure 3:
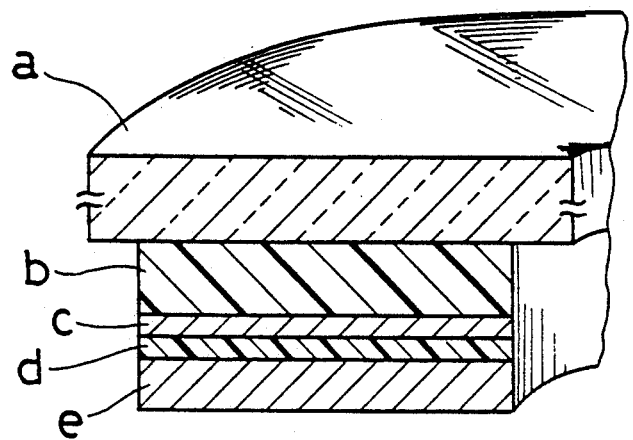
FIG. 3 is a fragmentary view in vertical section and showing a conventional magneto-optic disc.

A magneto-optic disc of the invention was prepared which had the same construction as the device of Example 1 except that the transparent glass substrate 8 used in Example 1 was replaced by a similar substrate 8 formed with a metal nitride film 9 (5 nm in thickness) on its surface, as seen in FIG. 2.

This disc (3) and a magneto-optic disc (4) having the same construction as the disc (3) except that the metal nitride film 6 was absent (comparative example) were subjected to the same pressure cooker test as in Example 1 for the evaluation of moistureproofness.

Consequently, pinholes were observed in the disc (4) four hours after the start of testing, whereas no pinholes were found in the disc (3) of the invention for 40 hours after the start of testing. Thus, the disc (3) was at least 10 times as high as the disc (4) in preventing moisture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A magneto-optic memory device comprising:
   a pair of opposed substrates, at least one of which is transparent;
   a magneto-optic memory layer comprising a dielectric film, a rare earth-transition metal alloy thin film, and a light reflecting film in this order at least on the surface of the transparent substrate opposed to the other substrate; and
   an adhesive layer, including a polymer resin formed on a nitride film, covering the memory layer and bonding the transparent substrate to the other substrate;
   said nitride film being made of a member of the group consisting of silicon nitride, aluminum nitride, and silicon-aluminum nitride and interposed between the light reflecting film of the memory layer and the adhesive layer.

2. The device of claim 1, wherein the memory layer has a further dielectric film between the rare earth-transition metal allow thin film and the light reflecting film.

3. The device of claim 1 or 2 wherein the memory layer is formed on each surface of the opposed two substrates.

4. The device of claim 2 wherein the dielectric film on the rear earth-transition metal alloy thin film has a thickness of 50 to 100 nm and the further dielectric film between the rare earth-transition metal alloy thin film and the light reflecting film is 10 to 100 nm in thickness.

5. The device if claim 1 wherein the metal nitride film has a thickness of 5 to 100 nm.

6. The device of a claim 1 wherein the metal nitride film has a thickness of 10 to 500 nm.

7. The device of claim 1 wherein the rare earth-transition metal alloy thin film is made of a member of the group consisting of GdTbFe, GdTbFeCo, TbFeCo, TbCo and TbFe alloy.

8. The device of claim 1 wherein the rare earth-transition metal alloy thin film is made of GdTbFe alloy.

9. The device of claim 1 wherein the rare earth-transition metal alloy thin film has a thickness of 5 to 100 nm.

10. The device of claim 1 wherein the dielectric film is made of a member of the group consisting of metal nitride, metal oxide and metal sulfide.

11. The device of claim 1 wherein said light reflecting film is made of a member of the group consisting of aluminum, nickel, titanium, gold, silver, tantalum aluminum-nickel, alloy and aluminum-titanium alloy.

12. The device of claim 1 wherein the light reflecting film has a thickness of 10 to 300 nm.

13. The device of claim 1 wherein the transparent substrate is made of a member of the group consisting of glass, polycarbonate resin, acrylic resin and epoxy resin substrate.

14. The device of claim 1 wherein the other substrate is made of a member of the group consisting of glass, polycarbonate resin, acrylic resin, expoxy resin, aluminum and a ceramics substrate.

15. The device of claim 1 wherein the other substrate comprises a metal nitride film on its surface opposed to the transparent substrate.

16. The device of claim 1, wherein said device is rectangular in shape.

17. The device of claim 1, wherein said device is disk shaped.

18. A pair of magneto-optic memory device comprising:
   (a) a pair of opposed substrates at least one of which is transparent,
   (b) a magneto-optic memory layer composed of a dielectric film, a rare earth-transition metal alloy thin film, a dielectric film and a light reflecting film in this order on the surface of the transparent substrate opposed to the other substrate,
   (c) an adhesive layer covering the memory layer and bonding the transparent substrate to the other substrate,
   (d) a metal nitride film interposed between the light reflecting film of the memory layer and the adhesive layer in which the are earth-transition metal alloy thin film is made of GdTbFe alloy having a composition $$(Gd_xTb_{1-x})_yFe_{1-y}$$

wherein x is 0.58 to 0.62 and y is 0.27 to 0.33.

19. The device of claim 1 wherein the magneto-optic memory layer is formed between the dielectric film and the light reflecting film.

* * * * *

UNITED STATES PATENT AND TRADEMARK OFFICE
CERTIFICATE OF CORRECTION

PATENT NO. : 5,305,254

DATED : April 19, 1994

INVENTOR(S) : Murakami et al.

It is certified that error appears in the above-identified patent and that said Letters Patent is hereby corrected as shown below:

Claim 2.  Column 6, line 60,
 delete "allow" and insert --alloy--.

Signed and Sealed this

Sixth Day of September, 1994

Attest:

BRUCE LEHMAN

*Attesting Officer*      *Commissioner of Patents and Trademarks*